Patented Dec. 11, 1951

2,577,900

UNITED STATES PATENT OFFICE 2,577,900

PROCESS FOR PRODUCING ANILS

George F. Lisk, Buffalo, and Gardner W. Stacy, New York, N. Y., assignors to the United States of America as represented by the Secretary of War No Drawing. Application June 20, 1947, Serial No. 756,086

2 Claims. (Cl. 260—471)

The present invention relates to the preparation of compounds having properties adapting them to be converted into drugs having antimalarial properties.

More particularly, the present invention relates to an improved method for preparing anils, particularly $\beta$-carbalkoxy-$\beta$-N-arylamino-acrylates.

Generally speaking, the process of the present invention comprises reacting an alkyl ester of a beta keto acid and an aromatic primary amine, preferably in the presence of a mineral acid, while removing the water generated in the reaction. The reaction may be represented by the equation:

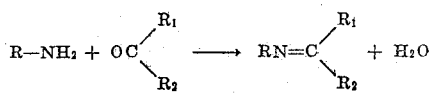

wherein R represents an aromatic nucleus, and

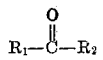

represents an alkyl ester of a beta keto acid (see Hackh's Chemical Dictionary, third edition).

In accordance with the present invention it has been found that anils which are derived from primary arylamines (for example, aniline) and sodium oxalacetic acid esters, or equivalents thereof, and which will be referred to by the name of their tautomeric modifications, namely, $\beta$-carboxy-$\beta$-N-arylamino acrylates, can be obtained in very substantially improved yields by removing the water formed in accordance with the above equation, or otherwise present, from the reaction system. Preferably, the water is removed as it is formed, by any suitable method, for example, by distillation, especially under reduced pressure and/or with the aid of a low-boiling entraining agent, such as toluene, or by vaporization into a current of gas, such as carbon dioxide, or nitrogen, passed through the reaction mixture, or by treatment with a suitable dehydrating agent, such as anhydrous sodium sulphate. Also, in accordance with the present improved process, the yield of anil can be further improved by carrying out the reaction in the presence of mineral acid, such as by employing an amount of hydrochloric acid in excess of that required to neutralize the sodium oxalacetate employed.

The process of the present invention is exemplified by the following illustrative examples:

EXAMPLE I

To a solution of 42.5 parts by weight meta-chloraniline in 1580 parts of a high-boiling solvent, conveniently the readily obtainable solvent known to the trade as "Dowtherm," which is a eutectic mixture of diphenyl ether and 26.5 per cent of diphenyl, melting at 12° C. and boiling at 258° C., 44 parts by weight of 20° Bé. hydrochloric acid were added slowly with agitation. Seventy parts by weight of sodium oxalacetic diethyl ester then were added at 20° to 30° C. and the reaction mixture was heated to approximately 60° C., and agitated at that temperature for three hours during which a rapid stream of carbon dioxide (6 to 8 liters per minute) was continuously passed through the mass to carry off the water present and formed in the reaction. The anil thus formed, the tautomeric modification of which is ethyl-$\beta$-carbethoxy-$\beta$-meta-chloranilino acrylate, was cyclized in situ by heating to 250° C. during 15 to 20 minutes, and agitated at that temperature until cyclization was complete; then the resulting ester was saponified by boiling with aqueous caustic soda solution. There was obtained a yield of 80 per cent of the theoretical yield of chlorohydroxyquinoline carboxylic acid in the form of a mixture of 5- and 7-chloro-4-hydroxyquinoline-2-carboxylic acids melting at 256 to 259° C.

When the foregoing example was repeated in identical manner except that the passage of carbon dioxide through the reaction mass was omitted, the yield of chlorohydroxy-quinoline carboxylic acids was only 55 per cent of the theoretical; and when the foregoing example was repeated exactly except that an amount of hydrochloric acid which, on a molar basis, was three per cent less than that theoretically required to convert all of the meta-chloraniline to the hydrochloride, the yield of ultimate chloro-hydroxyquinoline carboxylic acids was only thirty-one per cent of theory.

Instead of m-chloraniline, molecular equivalent proportions of the folowing aromatic amines have been employed in the foregoing example with the following results:

Table I

| Amine | Yield of Ultimate Chlorohydroxy-quinoline-carboxylic acid obtained on cyclization and Saponification (per cent theory) |
|---|---|
| Aniline | 78 |
| 4-methoxy-aniline | 81 |
| 3-chloro-2-methyl-aniline | 75 |

In the foregoing example the molal proportions of reactants employed were 0.33 mol of meta-chloraniline, 0.38 mol of the 20° Bé. hydrochloric acid and 0.33 mol of sodium oxalacetic diethyl ester.

EXAMPLE II

A moist cake containing 164 parts (1.0 mol) of m-chloraniline hydrochloride and about 0.05 mol of hydrogen chloride as free hydrochloric acid, which cake was obtained by mixing 127.5 parts (1 mol) of m-chloraniline with 121 parts (1.16 mol) of 35 per cent hydrochloric acid, cooling the resulting mixture to about 25° C., filtering and sucking the cake free from liquor, was dissolved in 800 parts anhydrous alcohol. Two hundred parts of anhydrous sodium sulphate were added and the mixture was cooled to 10° C. with an ice bath. Two hundred and ten parts (1.0 mol) of sodium oxalacetic diethyl ester were added, and the resulting mixture was agitated for two to three hours at 10° C., and thereafter for from ten to twelve hours while allowing the temperature to rise to 20 to 25° C. Then 2500 parts of water were added, and the resulting mixture was agitated for ten to fifteen minutes, and then allowed to stratify. The lower layer of liquid anil was drawn off, and amounted to 269 parts, or 90 per cent of the theoretical yield.

When the addition of anhydrous sodium sulphate was omitted in the foregoing example, only 229 parts of the anil, corresponding to 77 per cent of the theoretical yield, were obtained.

EXAMPLE III

A mixture of 164 parts (1.0 mol) of meta-chloraniline hydrochloride prepared as in Example II, above, and containing about 0.05 mol of free hydrochloric acid, and 650 parts of toluene, were charged to a dehydration still of the usual type adapted to separate water from toluene collected in the distillate, and to return such collected toluene to the still. There were added 210 parts (1.0 mol) of sodium oxalacetic diethyl ester, the addition being made at room temperature. The system was evacuated to about 40 mm. of mercury (absolute pressure) and the mixture heated to boiling (35°–40° C.) and refluxed for 12 hours to complete the reaction, which completion was indicated by absence of water in the distillate. The mass then was filtered to remove the sodium chloride, and the filtrate containing the anil was stripped of toluene by distillation under the aforementioned reduced pressure. In this manner 282 parts, or 95 per cent of the theoretical yield of anil, were obtained.

Instead of the sodium oxalacetic diethyl ester employed in the foregoing examples, there may be used corresponding amounts of oxalacetic diethyl ester, in which event it is not necessary to add mineral acid as such, or in the form of the hydrochloride of the arylamine employed, as shown above, to convert the sodium derivative into free oxalacetic diethyl ester.

Furthermore, in the foregoing examples the hydrochloric acid or hydrogen chloride need not be present in the free or uncombined state in the reaction mixture. Thus, as illustrated in the above examples, the slight (five per cent on a molal basis) excess of hydrochloric acid, which is left after the sodium oxalacetic ester is neutralized, probably is present in combined form as the hydrochloride of the arylamine during practically the entire reaction.

As is apparent from the foregoing, one of the principal improvements involved in the present invention is the removal of the water that is present in the reaction system, it being found that the removal of this water is necessary for the production of the anil in high yields. The removal of this water seems to drive the reaction to completion in a manner similar to the removal of one of the reaction components of an equilibrium reaction mixture which causes a shift in the equilibrium conditions. However, it is not intended to suggest that the formation of anils in accordance with the above set forth reaction is an equilibrium reaction.

In the practice of the process of the present invention, a condition which, like the removal of water, favorably affects the yield of anil, is the employment of the hydrochloric acid used in an amount which on a molal basis is at least equal to and preferably about 105 per cent of the amount required to neutralize the sodium salt of oxalacetic diethyl ester. Thus, it was found that by varying the amount of hydrochloric acid employed in the process described in Example I above, the yield of anil (in terms of ultimate chlorohydroxyquinoline carboxylic acids obtained in standard manner), varied as indicated in the following table.

*Table II*

| Mol per cent of Hydrogen chloride as Hydrochloric acid in excess (+) or below (−) that required to neutralize sodium diethyl oxalacetic ester | Yield of chlorohydroxyquinolinecarboxylic acids (per cent of Theory) |
|---|---|
| −3 | [1] 31 |
| 0 | 63 |
| +5 | 73 |
| +15 | [1] 80 |

[1] See Example I.

However, larger excesses of hydrochloric acid, amounting to as much as a 36 per cent molal excess of 20° Bé. hydrochloric acid, have been employed and do not effect any further significant yield improvements.

Instead of oxalacetic diethyl ester, there may be employed other esters of oxalacetic acid such as dimethyl and dipropyl oxalacetates; and mineral acids other than hydrochloric acid, for example hydrobromic acid, as well as organic acids, such as acetic acid. In general, the present process can be applied advantageously to the preparation of anils from primary arylamines and alkyl esters of beta keto acids, especially esters of oxalacetic acid, and acetoacetic acid, e. g. ethyl acetoacetate.

It may be noted that the known prior art methods for preparing the foregoing anils from arylamines and oxalacetic acid are distinguished from the present process in that they fail to remove the water formed or otherwise present during the reaction, and hence give relatively poor yields of the anils. Also, where these prior art processes have employed sodium oxalacetic acid esters, there is no recognition of the advantages in improved anil yields by the use of mineral acids as set forth above herein for neutralizing the sodium salt of the oxalacetic acid ester employed, which mineral acids markedly improve the yields of the anil under the conditions above set forth, as shown by Table II above.

From the foregoing, it will be apparent that certain critical factors must be observed for obtaining maximum yields of the desired product, but also it will be apparent that the present process is not restricted to the particular specific conditions of reaction set forth in the above illustrative examples, these reaction conditions being determined principally by the specific product which is desired, the particular reagents employed to produce that product, and the particular dehydrating agent that is employed in the operation of the process; and it will be apparent that such variations come clearly within the spirit and scope of the invention. Accordingly, it will be understood that it is intended to embrace within the scope of this invention such modifications and changes as may be necessary to adapt it to varying conditions and uses as defined in the appended claims.

Having thus described our invention, what we claim as new and wish to secure by Letters Patent is:

1. A process for producing anils, which comprises forming a reaction mixture consisting in molal proportions of 0.33 mol of m-chloraniline in a diphenyl ether solvent, 0.38 mol of 20° Bé. hydrochloric acid and 0.33 mol of sodium oxalacetic diethyl ester, heating the resulting mixture to a reaction temperature of 60° C., maintaining the mixture at the reaction temperature until the reaction is substantially complete, and dehydrating the reaction mixture as the reaction proceeds by passing a stream of carbon dioxide gas through the said system.

2. A process for producing ethyl-$\beta$-carbethoxy-$\beta$-meta-chloraniline acrylate, which comprises forming a reaction mixture consisting of, in molal proportions, 0.33 mol of meta-chloraniline in a diphenyl ether solvent, 0.38 mol of 20° Bé. hydrochloric acid, and 0.33 mol of sodium oxalacetic diethyl ester, heating the resulting mixture to a reaction temperature of approximately 60° C., maintaining the resulting mixture at the reaction temperature until the reaction is substantially complete, while dehydrating the reaction mixture as the reaction proceeds by passing a rapid stream of carbon dioxide through the mixture at a rate of approximately six to approximately eight liters per minute.

GEORGE F. LISK.
GARDNER W. STACY.

REFERENCES CITED

The following references are of record in the file of this patent:

UNITED STATES PATENTS

| Number | Name | Date |
|---|---|---|
| 2,218,587 | Reddelien | Oct. 22, 1940 |
| 2,220,065 | Clarkson | Nov. 5, 1940 |
| 2,418,173 | Haury et al. | Apr. 1, 1947 |
| 2,504,875 | Price | Apr. 18, 1950 |

FOREIGN PATENTS

| Number | Country | Date |
|---|---|---|
| 459,453 | Great Britain | Jan. 6, 1937 |

OTHER REFERENCES

Edgar A. Steck et al.: Jour. Amer. Chem. Soc., vol. 68, pp. 129-133 (1946).

Robert E. Foster et al.: J. A. C. S., vol. 68, pp. 1327-1330 (1946).

Breslow et al.: J. A. C. S., vol. 68, pp. 1232-1238 (1946).

Albert C. Mueller et al.: J. A. C. S., vol. 65, pp. 1017-1018 (1943).

Conrad et al.: Ber. Deut. Chem., vol. 20, pp. 944 to 948 (1887).

Limpach: Ber. Deut. Chem., vol. 64, pp. 969-970 (1931).

Musajo: Gazz. Chim. Italiana, vol. 67 (1937), pp. 222-230.